(12) United States Patent
Reynolds et al.

(10) Patent No.: US 8,081,740 B2
(45) Date of Patent: Dec. 20, 2011

(54) VOICE OVER IP METHOD OF DETERMINING CALLER IDENTIFICATION

(75) Inventors: Douglas F. Reynolds, Austin, TX (US); Jeffrey L. Brandt, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

(21) Appl. No.: 12/619,735

(22) Filed: Nov. 17, 2009

(65) Prior Publication Data

US 2010/0080373 A1    Apr. 1, 2010

Related U.S. Application Data

(63) Continuation of application No. 11/244,595, filed on Oct. 5, 2005, now Pat. No. 7,639,788, and a continuation of application No. 10/328,706, filed on Dec. 23, 2002, now Pat. No. 6,996,211.

(51) Int. Cl.
   *H04M 1/64* (2006.01)
(52) U.S. Cl. ............... 379/88.21; 379/142.16; 455/415; 370/356
(58) Field of Classification Search ............ 379/88.19, 379/88.2, 88.21, 142.01, 142.02, 142.03, 379/142.04, 142.05, 142.06, 211.01, 215.01; 370/352, 356, 415; 455/415
   See application file for complete search history.

(56) References Cited

U.S. PATENT DOCUMENTS

| | | | |
|---|---|---|---|
| 6,014,428 A | 1/2000 | Wolf | |
| 6,122,364 A | 9/2000 | Petrunka et al. | |
| 6,182,045 B1 | 1/2001 | Kredo et al. | |
| 6,195,357 B1 | 2/2001 | Polcyn | |
| 6,259,444 B1 | 7/2001 | Palmer et al. | |
| 6,314,402 B1 | 11/2001 | Monaco et al. | |
| 6,321,198 B1 | 11/2001 | Hank et al. | |
| 6,337,858 B1 | 1/2002 | Petty et al. | |
| 6,341,161 B1 | 1/2002 | Latter et al. | |
| 6,477,246 B1 | 11/2002 | Dolan et al. | |
| 6,519,326 B1 | 2/2003 | Milewski et al. | |
| 6,529,502 B2 | 3/2003 | Sarkissian et al. | |
| 6,574,319 B2 | 6/2003 | Latter et al. | |

(Continued)

FOREIGN PATENT DOCUMENTS

EP    0869688 A2    10/1998

(Continued)

OTHER PUBLICATIONS

Toshiba release titled "Toshiba Announces Strata CS Version 3.5, An Affordable, All-In-One Server-Based Business Communication System for Small-To Medium-Sized Businesses", printed from the Toshiba web site on Mar. 28, 2002, 4 pages.

(Continued)

*Primary Examiner* — Binh Tieu
(74) *Attorney, Agent, or Firm* — Cantor Colburn LLP

(57) ABSTRACT

Before completing a call initiated at a calling telephony device for a called telephony device; caller identification information for the calling telephony device is obtained for the call. If standard caller identification information is not available, the caller is prompted to provide spoken caller identification information. The caller identification information is communicated to the called telephony device via a connectionless protocol such as VoIP where a continuing connection does not exist between communicating end points. The called party is given call disposition options. The process which controls this operation may be located anywhere in the network, including at switching equipment and at the called telephony device.

10 Claims, 3 Drawing Sheets

U.S. PATENT DOCUMENTS

| | | |
|---|---|---|
| 6,650,743 B2 | 11/2003 | Heinmiller et al. |
| 6,680,935 B1 | 1/2004 | Kung et al. |
| 6,714,637 B1 | 3/2004 | Kredo |
| 6,779,020 B1 | 8/2004 | Henrick |
| 6,798,772 B2 | 9/2004 | Bergman et al. |
| 6,798,872 B1 | 9/2004 | Matsumoto et al. |
| 7,116,976 B2 | 10/2006 | Thomas et al. |
| 2001/0004361 A1 | 6/2001 | Kobayashi |
| 2001/0005372 A1 | 6/2001 | Cave et al. |
| 2001/0012355 A1 | 8/2001 | Dunn et al. |
| 2001/0055370 A1 | 12/2001 | Kommer |
| 2002/0041664 A1 | 4/2002 | Latter et al. |
| 2002/0097711 A1 | 7/2002 | Curry et al. |
| 2002/0150223 A1 | 10/2002 | Heinmiller et al. |
| 2003/0156693 A1 | 8/2003 | Goldman |
| 2003/0194078 A1 | 10/2003 | Wood et al. |
| 2003/0215078 A1 | 11/2003 | Brahm et al. |
| 2004/0114747 A1 | 6/2004 | Trandal et al. |
| 2006/0126820 A1 | 6/2006 | Trandal et al. |
| 2006/0142012 A1 | 6/2006 | Kirchhoff et al. |
| 2006/0153354 A1 | 7/2006 | Brahm et al. |
| 2006/0227957 A1 | 10/2006 | Dolan et al. |
| 2007/0189479 A1 | 8/2007 | Scherer |
| 2009/0059818 A1 | 3/2009 | Pickett |
| 2010/0142685 A1* | 6/2010 | Dolan et al. ............... 379/88.21 |

FOREIGN PATENT DOCUMENTS

| | | |
|---|---|---|
| EP | 1211875 A1 | 6/2002 |
| WO | WO9107838 A1 | 5/1991 |
| WO | WO0005860 A1 | 2/2000 |
| WO | WO02076112 A1 | 9/2002 |

OTHER PUBLICATIONS

TAC Web release titled "VoIP with IVR", printed from the TAC web site on Mar. 28, 2002, 3 pages.

Cisco release titled Cisco IP IVR—IV-Powered Interactive Voice Response Solution:, printed from Cisco web site on Mar. 28, 2002, 3 pages.

Cisco release titled "Cisco IP Interactive Voice Response", printed from Cisco web site at: <http://www.cisco.com/univercd/cc/td/doc/pcat/ipivr-.htm>, on Mar. 28, 2002, 4 pages.

SearchNetworking release titled "IP telephony—a search Networking definition", printed from web site at: <http:// searchnetworking.techta—rget.com/sDefinition/O,,sid7.sub.—gci212388,00.html>, on Nov. 8, 2002, 2 pages.

SearchNetworking release titled VoIP—a search Networking definition:, printed from web site at: <http://searchnetworking.techtarget.com/sDef- inition/O,,sid7.sub.—gci214148,00.html>, on Nov. 8, 2002, 2 pages.

VoIP Howto: Background, printed from web site at: <http://www.tldp.org/-HOWTO/VoIP-HOWTO-2.html>, on Nov. 8, 2002, 1 page.

VoIP Howto: Overview, printed from web site at: <http://www.tldp.org/HO-WTO/VoIP-HowTo-3.html>, on Nov. 8, 2002, 2 pages.

VoIP Howto: Technical info about VoIP, printed from web site at: <http://www.tldp.org/HOWTO/VoIP-HOWTO-4.html>, on Nov. 8, 2002, 4 pages.

VoIP Howto: Requirement, printed from web site at: <http://www.tldp.org- /HOWTO/VoIP-HOWTO-5.html>, on Nov. 8, 2002, 3 pages.

VoIP Howto: Setup, printed from web site at: <http://www.tldp.org/HOWTO-/VoIP-HOWTO-7.html>, on Nov. 8, 2002, 5 pages.

VoIP Howto: Communications using PSTN line, printed from web site at: <http://www.tldp.org/HOWTO/VoIP-HOWTO-8.html>, on Nov. 8, 2002, 2 pages.

European Search Report for counterpart European patent application No. 03787130.8 published Apr. 12, 2006, 3 pages.

EPO Communication pursuant to Article 96(2) EPC—(3 pages), Nov. 2005.

* cited by examiner

US 8,081,740 B2

VOICE OVER IP METHOD OF DETERMINING CALLER IDENTIFICATION

CROSS-REFERENCE TO RELATED APPLICATIONS

This application is a continuation of U.S. patent application Ser. No. 11/244,595 filed Oct. 5, 2005, the contents of which are incorporated herein by reference in their entirety which is a continuation of U.S. patent application Ser. No. 10/328,706 filed Dec. 23, 2002, now U.S. Pat. No. 6,996,211, the entire contents of which are incorporated herein by reference.

BACKGROUND

The present invention relates generally to telecommunication services and more particularly to caller identification using Voice Over Internet Protocol (VoIP) methods and systems.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. Also, the service provider may not be able to provide the standard Caller ID information if the call is marked "Private," indicating that the calling party has taken steps to suppress transmission of Caller ID information. This may be done, in some areas of the United States by, for example, pressing *67 when initiating a call.

When the standard Caller ID information cannot be provided, the called party is not adequately informed about who is calling and cannot determine whether or not to accept the incoming call before answering the call. Because the effectiveness of Caller ID systems is greatly reduced when information cannot be provided, there is a need for an improved system and method for providing caller identification information that overcomes these deficiencies.

Patent application Ser. No. 09/122,484, filed Jul. 24, 1998 is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

Patent application Ser. No. 09/253,339, filed Feb. 19, 1999 illustrates in further detail implementation of this technique in a telecommunications system including Advanced Information Network (AIN) elements. This application is incorporated herein by reference. The public switched telephone network (PSTN) includes a substantial number of AIN devices such as Service Switching Points (SSPs), Service Control Points (SCPs), Signalling Transfer Points (STPs) and Service Nodes (SNs) which may be configured to provide call handling methods, including caller identification.

However, to increase PSTN capacity and flexibility, many service providers and customers are developing Voice over Internet Protocol (VoIP) technologies. VoIP is a system in which voice or speech is converted to electrical signals and digitized. The digital signals are segmented into packets, with each packet including a header with addressing information and a payload of digital data. The speech data may also be compressed or converted to other formats to improve efficiency or network operation. Using the standardized transmission control protocol and Internet protocol (commonly referred to together as TCP/IP), packets are communicated from an origin through one or more network routers to a destination. The routers using the packet header for routing each packet.

While VoIP systems are effective for communication of speech information, many desirable features of AIN are missing from VoIP systems. For example, VoIP systems lack a method for processing calls when Caller ID information cannot be provided for a VoIP call. As a result, the call recipient lacks the necessary information for deciding to accept the call.

Accordingly, there is a need for an improved method and apparatus for providing enhanced caller identification information in a telecommunication system using VoIP systems and methods.

DETAILED DESCRIPTION OF THE DRAWINGS AND THE PRESENTLY PREFERRED EMBODIMENTS

By way of introduction, a system and method in accordance with the embodiments disclosed herein employ voice over internet protocol (VoIP) techniques for providing caller identification for a received call. Calls may be routed using VoIP links or any other component of the public switched telephone network (PSTN), including Advanced Intelligent Network (AIN) elements, or a combination of these technologies, including wireless links. The system permits handling of unidentified calls for which no caller information is available.

If a caller receives an unidentified call, the calling party is prompted that the called party does not accept unidentified calls. The calling party is provided several options, including in one embodiment unblocking the call, if call blocking is enabled, recording the caller's name for identification purposes, and entry of an access code provided by the called party to bypass the service.

If the called party accepts the recorded identification, the called party is further given call disposition options. These include accepting the call and being connected to the caller immediately, routing the call to voice mail and automatically informing the caller that solicitations are not accepted and to add the called party to the caller's "do not call" list. If the called party does not answer the call, it will be treated as a normal missed call.

In one embodiment, the caller can customize the language presentation as well as creating access codes for preferred callers, for example, via Interactive Voice Response, a World Wide Web based system, or a software application.

The system and method in accordance with these embodiments and extensions thereof will enable VoIP subscribers the opportunity to screen unknown and unwanted calls that would otherwise be unidentified using VoIP solutions. It is expected that VoIP systems will proliferate and this system allows older technologies to be updated and cooperate with newer technologies.

Figure 1:
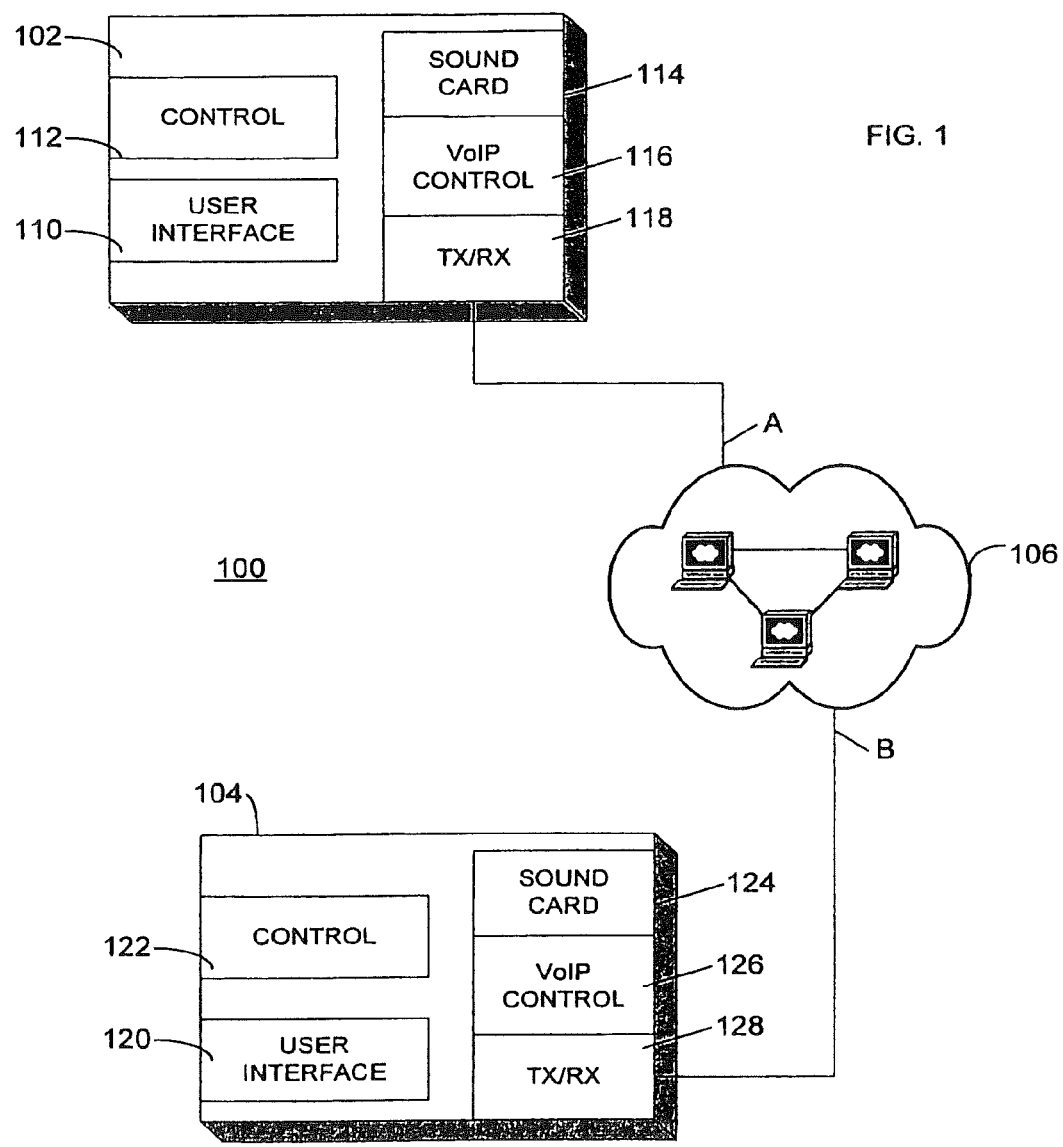
FIG. 1 is a block diagram of a communications system.

Referring now to the drawing, FIG. 1 is a block diagram of a communication system 100. The communication system 100 includes a first telephony device 102 and a second telephony device 104 interconnected by a communication network 106. The embodiment illustrated in FIG. 1 is exemplary only. Extensions, modifications and variations thereof will be readily apparent to those ordinarily skilled in the arts of telecommunications and computer system design and operation.

The first telephony device 102 includes a user interface 110, a controller 112, a sound card 114, a VoIP controller 116 and a network interface device 118. The second telephony device 104 is generally similar and includes a user interface 120, a controller 122, a sound card 124, a VoIP controller 126 and a network interface device 128.

Each of the telephony devices 102, 104 provides at least voice communication and may provide data communication. The telephony devices 102, 104 may be configured as a wide variety of devices. These include wire line telephones, wireless telephones, private branch exchanges (PBX), personal computers and personal digital assistants (PDA). This further includes any type of data processing device, such as a personal computer, data switch, gateway or router which may be connected to a network, including local area networks and external networks including the internet.

As noted, the composition of the various components of the telephony devices 102, 104 may vary. The user interface 102, 122 provides user control and information about operation of the respective telephony device 102, 104. In some embodiments, the user interface 102, 104 may include a keypad or keyboard, a touch sensitive pad, a display including light emitting diodes, a liquid crystal display, fluorescent or flat panel display or cathode ray tube (CRT) monitor. Also, for audio input and output, the user interface 102, 104 may include a microphone and speaker. The user interface 102, 104 provides user interaction with the device.

The controller 112, 122 may be implemented as any processor, computer, microcomputer, digital signal processor, logic circuit or other processing device. The controller 112, 122 controls the operation of the telephony device 102, 104. In a typical application, the controller 112, 122 includes digital logic that operates in conjunction with computer executable code to process data and instructions. In the embodiment, of FIG. 1, the controller 112, 122 includes a memory for storing data and instructions. However, in other embodiments, storage may be provided elsewhere in the device.

The sound card 114, 124 provides audio processing in the telephony devices 122. In particular, the sound card 114, 124 converts digital data received over the network 106 to audible speech and converts received analog speech signals to digital data. The sound card 114, 124 may also provide filtering, conditioning and other signal processing functions.

The VoIP controller 116, 126 controls voice over IP processing in the respective device 102, 104. In particular, the VoIP controller 116, 126 packetizes data including data representative of speech for transmission from the device and extracts speech data from received data packets. Packetizing data involves time-segmenting the speech data and formatting packets according to the communication protocol, such as internet protocol or IP. Formatting includes combining the packet payload of data with a packet header including source address information and destination address information. Speech extraction involves reconstructing speech from packets that have been sequentially generated by may be randomly retrieved due to routing variations over the network 106.

The network interface device 118, 128 provides physical layer communication specific to the network channel or link by which the respective telephony device 102, 104 communicates with the network 106. For example, if the telephony device 102 communicates over a 56 Kbytes/sec modem to a twisted-pair telephone wire, the network interface device 118 is embodied as such a modem, along with associated hardware and software. If, on the other hand, the telephony device 104 communicates over a wireless link with the network 106, the network interface device 128 includes appropriate transmit (TX) and receive (RX) circuitry, modulators and demodulators, local oscillator, etc. The respective network interface device provides the necessary communication facilities.

Figure 2:
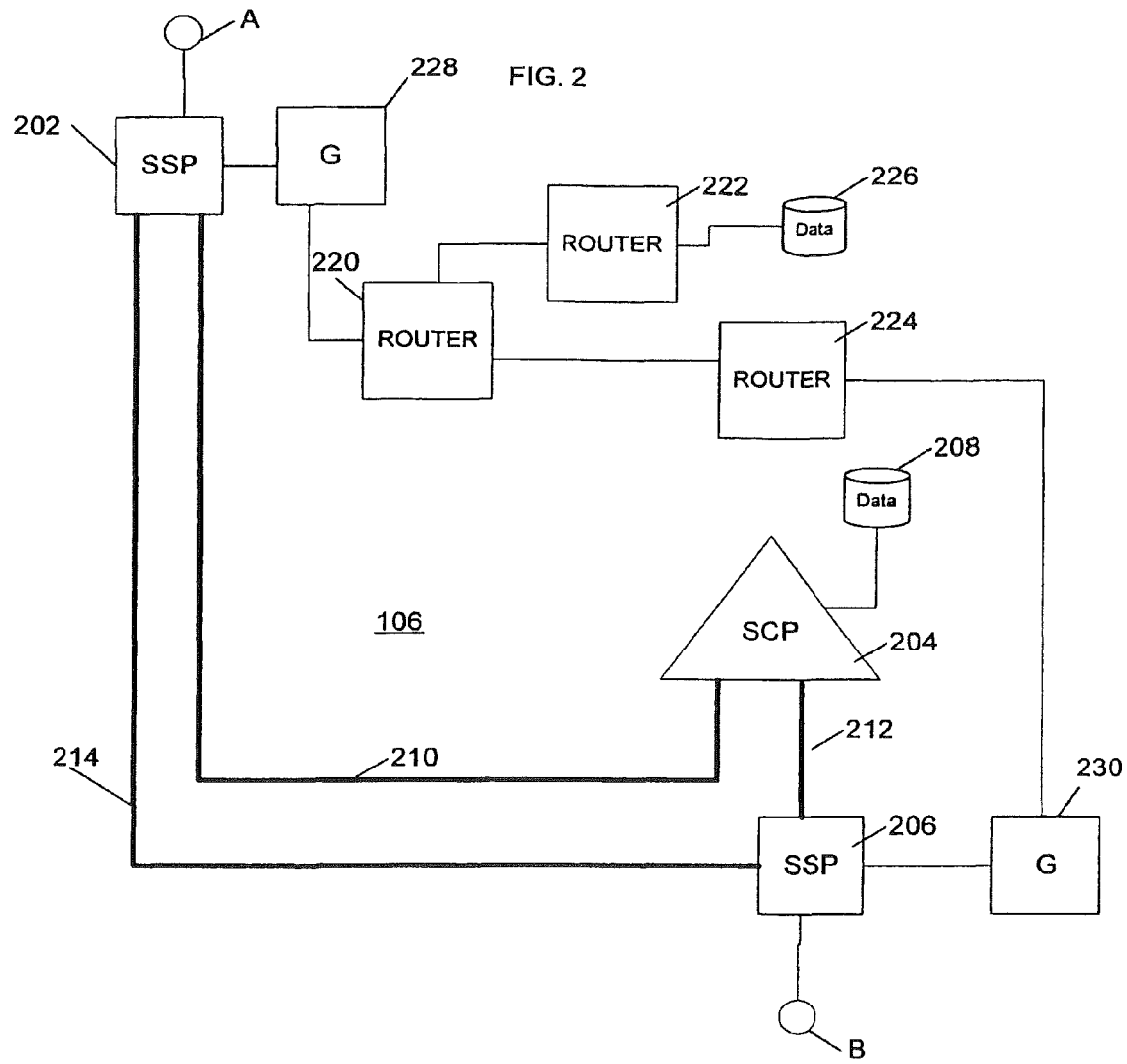
FIG. 2 is a block diagram of a portion of the communication system of FIG. 1.

FIG. 2 is a detailed view of one embodiment of the network 106. In the exemplary embodiment of FIG. 2, the network 106 includes a combination of Advanced Intelligent Network (AIN) elements and routers which operate according to a connectionless telephony protocol such as Transmission Control Protocol/Internet Protocol (TCP/IP). The network 106 is thus representative of the public switched telephone network, which combines elements of both connectionless and connection oriented communication.

Connection oriented communication is exemplified by AIN and it communication system, Signalling System 7. In a connection oriented network, a connection is established between communicating end points and the connection is maintained throughout the duration of the communication. In an AIN network, a connection is made from a calling party to a local end office switch. The switch is connected through the network to a second local end office switch, which serves the called party. Connections in the path may be temporary and may be dropped after the call is complete. However, during the call, the connections are maintained, even is there is little or no traffic over the connection.

A connectionless communication system is exemplified by the internet as accessed by TCP/IP. Any communication is packetized, or broken down into discrete packets of digital data or packet data. The packets include data for communication from the calling party to the called party. The packets also include control data such as the network address of the calling party and the network address of the called party. Each packet is transmitted over the network, which includes a plurality of routers. The routers read the control information of the packet and route the packet accordingly. Because of traffic and other conditions, the path from calling communication station to called communication is in general random and each packet takes an independent path through the network. The packets are reassembled at the called communication station for presentation to the calling party.

Thus, the exemplary network 106 of FIG. 2 includes AIN components including a first service switching point (SSP) 202, a service control point (SCP) 204 and a second SSP 206. The network may include other AIN components and provide additional connectivity. Each of SSP 202 and SSP 204 includes in this embodiment an AIN switch that routes calls, recognizes and responds to triggers, generates queries to obtain call information and responds to returned call information. SCP 204 in this embodiment an AIN element that stores call information and receives and responds to queries. SCP 204 stores call control information in an associated SCP database 208 and can access the stored call control information. SCP 206 also stores standard caller identification information in the SCP database 208 and can access the stored caller identification information. SCP 204 receives queries generated by SSP 202 and SSP 206 and preferably responds to the queries by performing database searches to locate the requested call control information or caller identification information as known to those skilled in the art. SCP 204 can forward the call control information or caller identification information to SSP 202 and SSP 206. The SCP 204 communicates with the SSP 202 over a link 210. The SCP 204 communicates with SSP 206 over a link 212. The SSPs 204, 206 communicate over a link 214.

In the context of FIG. 1, if the telephony device 102 is a telephone device, the SSP 202 connects with the telephony device 102 and provides end office switching functions for the telephony device. The telephony device 102 and the SSP 202 are connected by a local loop telephone line. Similarly, the SSP 206 serves as an end office for the telephony device 104 and is connected to the telephony device 104 by a local loop telephone line if the telephony device is a land line telephone or similar device. If the telephony device 104 is a wireless or other radiotelephone, the SSP 206 may connect with the telephony device 104 through a radiotelephone system including a mobile switching center and a base station.

Operating in parallel with the connection oriented network formed by the AIN components is a connectionless network formed by routers 220, 222, 224 and gateways 228, 230 all communicating using a connectionless protocol such as TCP/IP. Each router 220, 222, 224 receives packets, makes routing decisions based on the control information contained in the packets, and forwards the packets in accordance with the routing decisions. The router 222 further includes a router database 226 which stores information including caller identification information. The gateways 228, 230 provide communication access to the connectionless network. The gateway 228 is connected to SSP 202 and the gateway 230 is connected to the SSP 206 to provide access and communication between the AIN network and the TCP/IP network. The network may include other connectionless protocol devices, such as an Internet Protocol (IP) Centrex or central exchange, an IP private branch exchange (PBX) is integrated services digital network (ISDN) switch.

Figure 3:
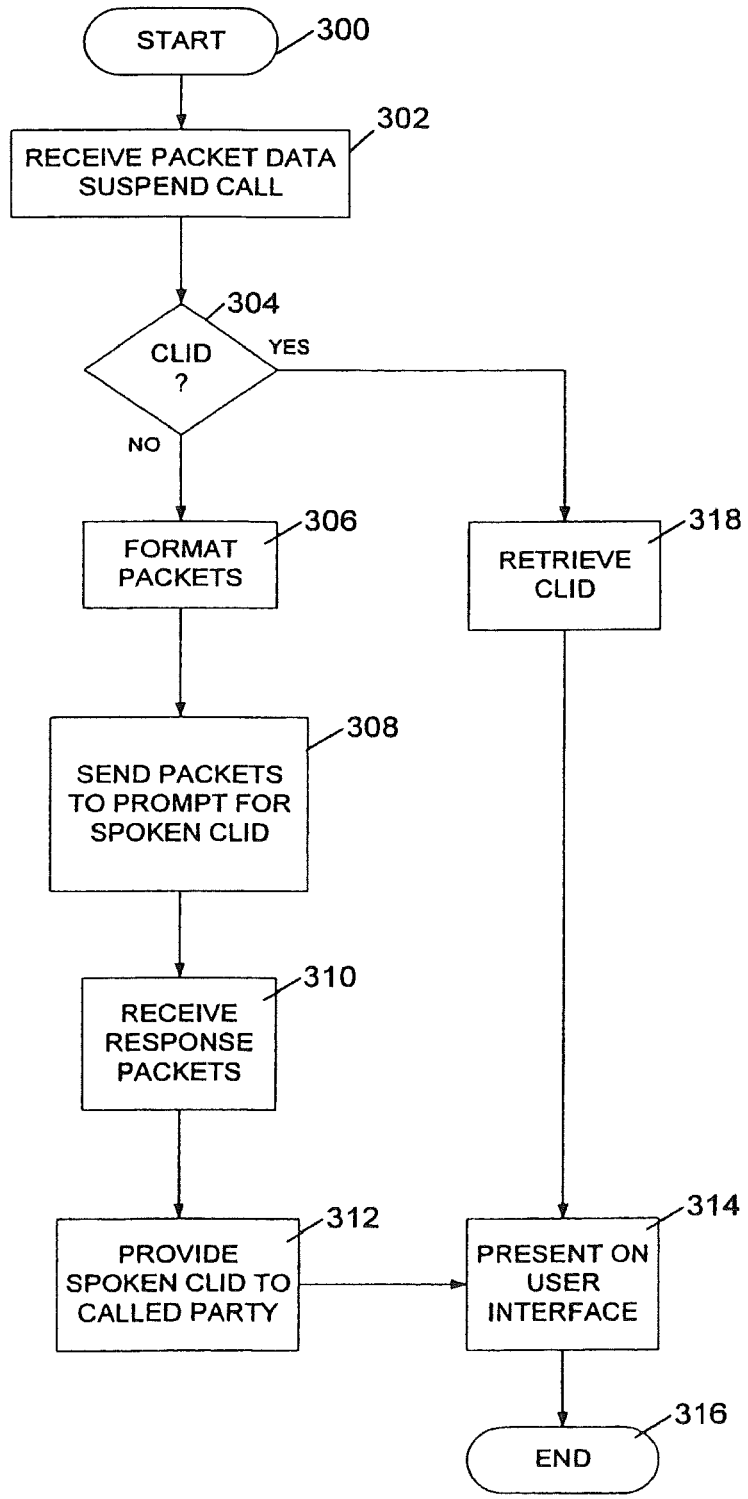
FIG. 3 is a flow diagram illustrating operation of one embodiment of the communication system of FIG. 1.

FIG. 3 is a flow diagram illustrating one embodiment of a method for operating the communication system 100 of FIG. 2. The method illustrates operation of a connectionless network such as a VoIP communication system. In the illustrated method, a call from a calling party at a calling communication station such as the telephony device 102 of FIG. 1 is received in a communication network such as the network 106. The call is first blocked from completing and processed to determine if caller identification information (CLID) can be provided. If not, an attempt is made to obtain caller identification for the call.

Thus, before completing a call initiated at a calling telephony device for a called telephony device; the method includes obtaining caller identification information for the calling telephony device. The method further includes communicating the caller identification information to the called telephony device via a connectionless protocol where continuing connection does not exist between communicating end points.

The caller identification information may be obtained in any available manner. In an AIN system, identification information for the communication device which originates the call is including in the signaling that sets up the call. In one example, the caller identification information may be retrieved from an AIN data source such as a query message or trigger and included in one or more packets of IP data representing the call.

In another example, the caller identification may be retrieved from a database in the network, such as the database 226 associated with the router 222 in FIG. 2. If a data packet including address information for the calling communication station is received at the router 222, the router 222 may supplement the control information of the packet with the caller identification information. If another router receives a data packet including address information for the calling communication station, the router may send a query to the router 222 seeking the caller identification information associated with that address information. If available in the database 226, the router 222 returns a response message to the querying router with the CLID information which is then added to the control information of the packet.

In yet another example, the calling party is prompted to provide audible caller identification information. The calling party may be given other prompts or options as well. In this embodiment, all communication is by means of a connectionless protocol such as TCP/IP. One method embodying this example is shown in FIG. 3.

The method of FIG. 3 may be implemented in software, hardware or any combination of the two. Moreover, the method of FIG. 3 may be performed at any suitable location in the network. In exemplary embodiments, the method is implemented as a service resident on VoIP switching equipment, such as an IP Centrex, an IP PBX or ISDN switch. In other embodiments, the method is implemented in customer premise equipment (CPE) such as a telephone, radiotelephone or adjunct equipment such as a digital answering machine, or on a user's personal computer or other processing device. The method may be embodied as a software package stored at and operating in conjunction with any network device. The software package includes a computer readable medium such as a magnetic or optical medium having computer executable software code stored thereon for processing a call in a network from the calling party at the calling telephony device to the called party at the called telephony device. The service may be sold on a subscription basis to subscribers. The method begins at block 300.

At block 302, one or more packets of data for the call are received. The packets may be received at a router, Centrex, PBX or other network equipment, or may be received at customer premise equipment. The one or more data packets are call initiation packets and contain control information, such as command information defining the call set up procedure to be followed and address information, including the network address of the calling party or caller and the network address of the called party. Alternatively, or in addition, the address information may define the telephone number of the calling party or the telephone number of the called party. Each of the calling party and the called party has associated therewith a telephony device or communication station which is connectable to the network by wire line or wireless link.

In response to the received packets, the call is suspended pending further processing. A message may be played to the calling party.

At block 304, the software package or device determines if caller identification information may be provided for the call. The caller identification may not be available due to a number of different occurrences. One such occurrence is the inability of a service provider to provide the standard caller identification information for a particular incoming call. This may occur if the caller identification information is blocked or the call is marked Private by the calling party, or if the caller identification information is unavailable or incomplete.

For a VoIP packet seeking to initiate a call, the device which receives the packet may analyze the control information contained in a header of the packet. If the caller identification information is present, operation of the device proceeds to block 318. If the caller identification information is not present, operation of the device proceeds to block 306.

At block 306, packets forming a request are formatted for transmission to the calling party at the calling communication station. In one embodiment, the request is for audible caller identification information. The request for audible caller information may include an informational message, such as a statement that the called party does not accept unidentified or telemarketing calls. The request may include data which, when played through the user interface of a telephony device, produces an audible spoken message. In addition to a request for audible caller identification information, or in place of such a request, the request may prompt the calling party to take some other action, such as entering an access code or to unblock the caller identification information for the calling communication station. In another embodiment, the request may play a no solicitation message to the caller, informing the caller that the called party does not accept calls from unidentified callers. Any other suitable message or prompt may be formatted in packets for communication to the calling party.

The packets are formatted with a header including addressing information and any other required control information. The header also includes the address of the network element or customer premise equipment (CPE) which originates the request and to which a response should be sent. The packets are formatted with a data portion which includes data to control the playing of the request to the calling party. The data may be data representative of speech, for example, data can be provided to a text to speech module to play the request to the calling party. Alternatively, the data can cause a pre-recorded message to be selected from a database in the network and played to the calling party. In the illustrated embodiment, the packets are formatted according to a VoIP protocol, but any suitable protocol including any connectionless communication protocol may be used to format the packets.

The request data packets are sent to the calling communication station at block 308. In accordance with a connectionless protocol, the message is packetized and the packets are sent to a gateway and routers of the network, which route the individual packets according to their address information and other network considerations.

In response to the prompts contained in the request data packets, the calling party takes some action. For example, the calling party may speak his name, producing audible or spoken caller identification information. The calling party may enter an access code, using a keypad or keyboard of the calling communication station. The response is packetized at the calling communication in an appropriate format, including a packet header with address and other control information. The response packets are then communicated over the network to the network component or CPE controlling the process.

At block 310, the response packets are received. In a manner consistent with IP or other connectionless protocol processing, the packets are reassembled into proper order and the response is detected. A suitable reaction to the response then occurs. In the exemplary embodiment of FIG. 4, the spoken caller identification information is provided to the called party, block 312.

If the illustrated process is operating on the called communication station, the controller of the called communication station activates the user interface of the called communication station, block 314, to provide the caller identification information. For example, an alert may be sounded to indicate the incoming call and, when the alert is acknowledged by the user of the called communication station, the audible caller identification information is played through a speaker to the user. If text data defining the caller identification information is available, the text data may be presented on a display of the user interface. The called party is also given call disposition options, such as accepting the call, rejecting the call or routing the call to voice mail.

Other suitable reactions to the response may occur as well. If the response includes an access code, the device receiving the access code validates the provided access code. Validation may include comparing the received access code with a stored list of valid access codes and returning a result. The result includes an indication of the validity of the access code. The result may also include the stored caller identification information associated with the received access code, which is provided on the CPE user interface.

If the illustrated process is operating on a network element other than the called communication station, such as on an IP Centrex or IP PBX, the network element formats an appropriate forwarding message for the called communication station. If the response from the calling communication station includes caller identification information, the forwarding message conveys the caller identification information to the called party along with call disposition options, along with call disposition options such as accepting or rejecting the call, or routing the call to voice mail. If the response from the calling communication station includes a valid access code, the call is completed immediately to the called communication station. The network switch or element in one embodiment acts like an AIN intelligent peripheral, that is, it acts as an agent that manages switching. In this case, it manages switching between the two platforms. The network element acts as an intelligent agent within a peripheral device to manage switching of the call. The network element communicates the forwarding message to the called party using IP or other connectionless protocol and awaits a response.

When the forwarding message is received at the called communication station, the audible caller identification information is provided to the user interface for the called party. The call disposition options are also provided and the called party is prompted to select a call disposition option.

When a call disposition option has been selected, a selection message is formatted at the called communication station and returned to the network element handling the process. The selection message includes one or more packets including data defining how the call should be handled. If the called party opts to complete the call, the network element completes the call between the calling communication station and the called communication station. As described above, the network element acts as an intelligent agent within a peripheral device to manage switching of the call. If the called party rejects the call, the network element cancels the call, and may format a cancellation message to the calling communication station, notifying of the cancellations. If the called party opts to send the call to voice mail, the network element activates a voice mail process. The voice mail process plays an outgoing message to the calling party and records an incoming message from the calling party, if one is provided. The voice mail process may reside at the network element processing the call or the call may be routed over the connectionless network to another device which provides the voice mail process.

As can be seen from the foregoing, the disclosed method and apparatus provide caller identification information in a connectionless network using, for example, VoIP processing. A call is suspended while availability of standard caller identification information is tested. VoIP messages are used to prompt the caller for caller identification information, or to provide the caller with other options, and to forward the provided information to the called party. The process which controls the operation may reside at any convenient locations in the network, including customer premises equipment or network switching elements.

While a particular embodiment of the present invention has been shown and described, modifications may be made. It is therefore intended in the appended claims to cover such changes and modifications which follow in the true spirit and scope of the invention.

The invention claimed is:

1. Apparatus for providing caller identification information associated with a calling communication station to a called party, the apparatus comprising:
   a caller identification server means for obtaining the caller identification information for the calling communication station;
   means for determining whether the caller identification information associated with the calling communication station is blocked;
   first prompting means for prompting a calling party associated with the calling communication station to record spoken caller identification information and to store data representative of the spoken caller identification information;
   second prompting means for prompting the calling party to unblock the blocked caller identification information and to store data representative of the unblocked caller identification information;
   packaging means for converting the data representative of the spoken caller identification information or the data representative of the unblocked caller identification information into data packets; and
   a dispatch device to transmit the data packets to a device associated with an address via a network.

2. The apparatus of claim 1 further comprising:
   real time routing means for routing packets via different routes using a real time protocol (RTP) for timely transmission of the data packets.

3. The apparatus of claim 1 wherein the caller identification server means further comprises:
   access means for retrieving from a database caller identification data for the calling communication station when the standard caller identification information is unblocked; and
   facilities to communicate the caller identification data to the called party using a connectionless protocol.

4. A method for processing a call in a communications system, the method comprising:
   detecting a call from a calling party at a calling communication station to a called communication station;
   determining if standard caller identification information for the calling communication station can be provided to the called communication station;
   if standard caller identification information cannot be provided, formatting internet protocol packets bearing a request for spoken caller identification information and transmitting the packets to the calling communication station;
   storing data defining the spoken caller identification information when provided;
   if standard caller identification information can be provided, obtaining data defining the standard caller identification information;
   formatting the stored data defining the spoken caller identification information or the data defining the standard caller identification as packets; and
   providing the packets to the called communication station to be reassembled for playback to a called party of the called communication station.

5. The method of claim 4 wherein determining if standard caller identification can be provided comprises:
   determining if the call from the calling party includes signaling information defining the standard caller identification.

6. The method of claim 4 wherein determining if standard caller identification can be provided comprises:
   retrieving the standard caller identification information from a name and number database of the communications system.

7. A method for operating a telephony device, the method comprising:
   receiving call packet data for a call from a caller over a connectionless network;
   if the call packet data defines caller identification information for the call, sounding an incoming call alert;
   if the telephone call packet data does not define caller identification information, formatting packets for communication over the connectionless network to prompt a caller originating the call to provide spoken caller identification information;
   subsequently, receiving over the connectionless network packet data defining the spoken caller identification information over the connectionless network;
   providing the spoken caller identification information on the user interface of the telephony device; and
   providing information on the user interface of the telephony device to give the user of the called party options to
   accept the call,
   reject the call,
   forward the call to voice mail,
   present a no solicitation message to the calling party, and
   block future calls from the calling telephony device.

8. The method of claim 7 further comprising:
   formatting packets for communication over the connectionless network to prompt the caller to provide an access code;
   receiving data defining the access code;
   validating the access code; and
   sounding the incoming call alert of the telephony device in response to validation of the access code.

9. The method of claim 8 further comprising:
   when sounding the incoming call alert, providing a user interface access call identification.

10. The method of claim 7 wherein formatting the packets comprises:
    packetizing a caller prompt inviting the caller to either provide the spoken caller identification information or to unblock standard caller identification information.

* * * * *